United States Patent
Brammer et al.

(10) Patent No.: US 6,220,078 B1
(45) Date of Patent: Apr. 24, 2001

(54) VIBRATION PICKUP WITH A PRESSURE SLEEVE

(75) Inventors: Hartmut Brammer; Wolfgang Schmidt, both of Vaihingen; Holger Krebs, Erdmannhausen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/323,788

(22) Filed: Jun. 2, 1999

(30) Foreign Application Priority Data

Jul. 1, 1998 (DE) .............................. 198 29 379

(51) Int. Cl.$^7$ ................................ G01L 23/22
(52) U.S. Cl. ................ 73/35.11; 73/654; 73/702
(58) Field of Search .................. 73/35.11, 654, 73/652, 35.01, 35.07, 35.09, 35.13, 35.12, 702, 756; 310/329, 338; 123/435

(56) References Cited

U.S. PATENT DOCUMENTS

| | | | |
|---|---|---|---|
| 4,944,179 | 7/1990 | Komurasaki | 73/654 |
| 5,398,540 | * 3/1995 | Entenmann et al. | 73/35.11 |
| 5,440,933 | * 8/1995 | Brammer et al. | 73/35.11 |
| 5,739,418 | * 4/1998 | Hackel et al. | 73/35.11 |
| 5,798,453 | * 8/1998 | Brammer et al. | 73/35.11 |
| 5,872,307 | * 2/1999 | Brammer et al. | 73/35.11 |

FOREIGN PATENT DOCUMENTS

| | | |
|---|---|---|
| 44 03 660 | 10/1994 | (DE) . |
| 195 24 152 | 5/1996 | (DE) . |
| 195 24 148 | 8/1996 | (DE) . |
| 195 42 729 | 10/1996 | (DE) . |
| 195 24 147 A1 | 1/1997 | (DE) . |

* cited by examiner

Primary Examiner—Helen Kwok
(74) Attorney, Agent, or Firm—Michael J. Striker

(57) ABSTRACT

A vibration pickup has a pressure sleeve mountable directly or indirectly on a component causing vibrations, a spring, a sensor element which is held radially outwardly on the pressure sleeve with an axial tensioning by the spring and is electrically contactable, a wedge element provided between an inner periphery of the spring and an outer wall of the pressure sleeve, the wedge element being introduced axially with its wedge-shaped tipped side and radially clamps the spring in an end position and also holds components with the sensor element under an axial tensioning.

23 Claims, 4 Drawing Sheets

VIBRATION PICKUP WITH A PRESSURE SLEEVE

BACKGROUND OF THE INVENTION

The present invention relates to a vibration pickup with a pressure sleeve.

Vibration pickups of the above mentioned general type are known in the art. One of such vibration pickups with a pressure sleeve is disclosed for example in the German patent document DE 195 24 147.9. It is formed as a knock sensor for monitoring the operation of an internal combustion engine in a motor vehicle. The pressure sleeve is joined through an abutment region fixedly to a component which causes vibrations, for example a motor block of the internal combustion engine.

The vibrations to be detected are knock noises of the internal combustion engine during the operation. They are transmitted through a pressure sleeve to a piezo-ceramic disk as a sensor element, with intermediately located contact disks and insulating disks which allow picking up of a signal, so as to form an evaluatable electrical output signal.

This type of mounting or clamping of the sensor element on the pressure sleeve and the mounting of the pressure sleeve on the vibrating component has a great influence on the manufacture. The clamping of the sensor element together with a plurality of individual components, for example with a spring and a seismic mass is performed in the known vibration pickup with a threaded ring which is screwed on the corresponding thread of the pressure sleeve and directly abuts on the seismic mass.

The clamping of the components on the pressure sleeve is a substantial cost factor. All components must be firmly compressed with a defined mechanical pre-tensioning and remain so. When the pre-tensioning changes, also the transmission characteristic line changes and the evaluation becomes more difficult.

SUMMARY OF THE INVENTION

Accordingly, it is an object of the present invention to provide a vibration pickup which avoids the disadvantages of the prior art.

In keeping with these objects and with others which will become apparent hereinafter, one feature of present invention resides, briefly stated in a vibration pickup with a pressure sleeve, a sensor element and a spring, in which between the inner periphery of the ring-shaped spring and the outer wall of the pressure sleeve a wedge ring is arranged so that its wedge-shaped tipped side is mounted axially and it clamps the spring in its end position and also holds simultaneously the components with the sensor element under an axial pre-tensioning.

When the vibration pickup is designed in accordance with the present invention, it can be produced with relatively simple manufacturing steps and at the same time has a great strength. With the wedge ring arranged between the ring-shaped spring and the wall of the pressure sleeve, a reliable connection of the components of the pressure sleeve is provided in a simple manner.

The wedge ring with its wedge-like tipped side clamps in its end position the spring radially and simultaneously provides an axial pre-tensioning required for the sensor element in simple and reliable manner.

It is especially advantageous when the wedge ring is axially slotted. Thereby, an insertion is possible with great manufacturing tolerances. This embodiment has the advantage that during final injection molding of the arrangement, synthetic plastic can penetrate through the slots into the inner region between the pressure sleeve and the seismic mass.

The above mentioned intermediate spaces are produced when in accordance with another embodiment of the present invention at least three wedges are arranged between the inner periphery of the ring-shaped spring and the outer wall of the pressure sleeve. They are inserted with their wedge-shape tipped side axially and in their end position clamp the spring radially in the same way as in the first embodiment. The wedges can be formed in an advantageous manner as circular segments, wedges with straight contour, or wedge pins.

In order to guarantee the stability of the connection between the pressure sleeve and the wedge ring or the wedge, the wedge ring or the wedge are composed of a material, with which after clamping of all components of the vibration pickup, the spring and the barb on the pressure sleeve are kneaded in the wedge ring or the wedge. Such a good fixing of the wedge ring or the wedge means that the characteristic line of the vibration pickup over a service life can be maintained very stable.

An especially good seat of the wedge ring or the wedge is obtained when the gripping surface of the wedge ring or the wedge on the pressure sleeve has a rough surface contour. For example a groove, a thread or a wafer pattern can be provided, with which a fixed seat even in condition of high shaking movements of the vibration pickup can be guaranteed in a simple manner.

In accordance with a further alternative embodiment of the invention, in advantage manner a ring with an inner thread and a wedge-shape projection is mounted between the inner periphery of the ring-shaped spring and the outer wall of the pressure sleeve. It is turned in axially with its wedge-shape tipped side and in its end position radially clamps the spring as in the above described embodiment. With this embodiment the clamping of the components is guaranteed by the thread, since here no self-locking projection can be provided by the wedge shape. The lower wedge-shaped tip of the ring serves first of all for centering of the components on the pressure sleeve. Thereby also a relatively flat angle of the wedge-shape of the flat angle is possible.

The wedge-shaped tip of the ring of the above mentioned embodiment can be straight or for example has a substantially concave, convex, parabolic or hyperbolic contour.

In a deviation from the above described embodiment, a ring with an inner thread and a step projection can be mounted between the inner periphery of the ring-shaped spring and the outer wall of the pressure sleeve. With its tip side having at least one step it is turned-in axially, and radially clamps the spring in its end position and therefore centers it in advantageous manner. Metal, for example steel can be selected as a material for the wedge ring, the wedges or the ring with an inner thread.

In accordance with a preferable embodiment, the wedge ring or the wedges are composed of synthetic plastic. This has the additional advantage that the electrical insulation of the sensor element from the pressure sleeve is simultaneously provided. The originally required upper insulation disk on the sensor element can be dispensed with. Since the signal pickup can be withdrawn directly from the metallic seismic mass, also the upper contact disc can be spared.

When in the inventive vibration pickup a wedge ring of synthetic plastic is used, the acoustic properties of the vibration pickup are also improved. The structure-born noise which reaches the vibration pickup from outside can be coupled by the bottom support of the vibration pickup and in this way by the screwing can be substantially dampened from above through the insertion of the synthetic plastic wedge ring or the wedges.

The wedge ring or the wedges can be welded after the mounting without additional holding means in a simple manner, in particular by laser welding. With the above described arrangement of the wedge ring or the wedges, a pre-tensioning is provided, which makes possible an intermediate measurement of the vibration pickup. Then after the completed welding, the injection molding with the synthetic plastic mass provides a final vibration-fixed mounting.

In an advantageous embodiment, the vibration pickup is formed as a knock sensor for vibrations on a motor block of an internal combustion engine.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
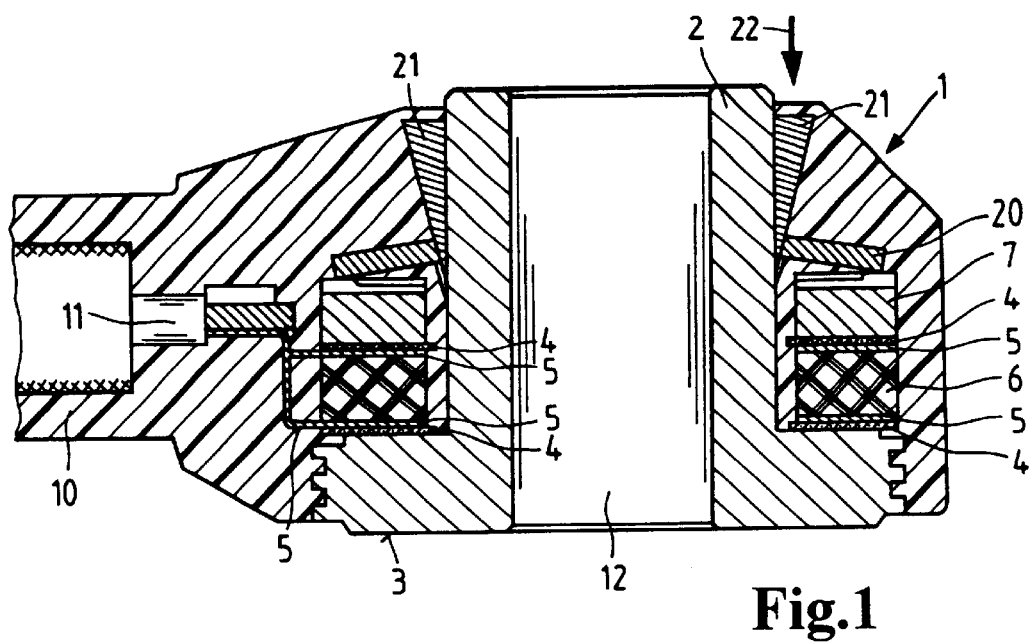
FIG. 1 is a view showing the section of a knock sensor housing as a vibration pickup with a wedge ring between a spring and a pressure sleeve.

FIG. 1 is a view showing a vibration pickup which is formed as a knock sensor for an internal combustion engine. It has an outer synthetic plastic housing 1, and a pressure sleeve 2 arranged in the housing. It is supported with its lower surface 3 on a not shown motor block whose vibrations must be detected.

Several parts are arranged on the periphery of the pressure sleeve 2 starting from its lower edge, as follows: an insulating disk 4, a first contact disk 5, a piezo-ceramic disk 6 forming a sensor element, and moreover a second contact disk 5 and a second insulating disk 4. A seismic mass 7 is placed on this arrangement. It is pressed by a ring-shaped spring 20 in direction toward the piezo-ceramic disk 6. A wedge pin 21 is inserted in an axial direction in accordance with an arrow 22 between the outer periphery of the spring 20 and the wall of the pressure sleeve 2.

Figure 2:
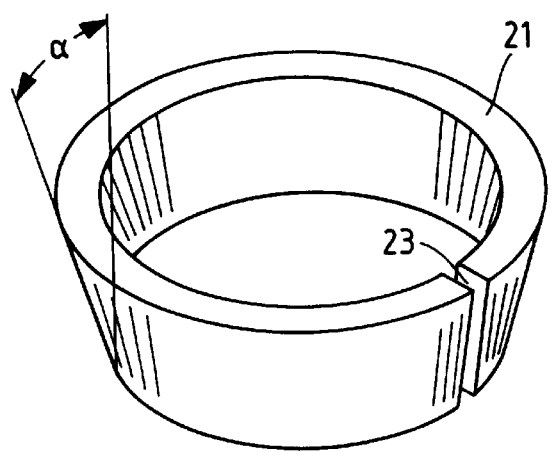
FIG. 2 is a view showing a slotted wedge ring of the inventive vibration pickup.

The wedge ring 21 which is inserted with its wedge-shape tipped side in an axial direction clamps the spring 20 radially inwardly and provides an axial tensioning which is required for the sensor element 6. Thereby it provides a reliable and firm connection of the components. The wedge ring 21 can be also radially slotted in a manner which is not shown in the drawings. Thereby a use is possible with greater manufacturing tolerances. The slot 23 is a throughgoing slot extending in an axial direction as shown in FIG. 2.

In the embodiment shown in FIG. 1, the wedge ring 21 is composed of metal, for example of steel. For the case when the wedge ring is composed of synthetic plastic, a further simplified, not shown embodiment can be selected. In particular the electrical insulation of the piezo-ceramic disk or the sensor element 6 from the pressure sleeve 2 can be provided by the wedge ring 21. The required upper insulation disk 4 on the sensor element 6 can be dispensed with. Since the signal pickup is directly taken from the metallic seismic mass 7, also the upper contact disk 5 of the sensor element 6 can be spared.

The vibration pickup has an integrated connecting part 10 for the housing 1 which is composed of synthetic plastic and produced by injection molding. An electrical connection 11 for the contact disks 5 is injection molded in the integrated connect part 10. The electrical connection 11 is here formed of one piece with the corresponding contact disk 5. An electrical connection is thereby established through the both contact disks 5 to the both sides of the piezo-ceramic disk 6. The electrical voltage which is produced under the action of a pressure load of the piezo-ceramic disk 6 is taken at the connections 11.

The pressure sleeve 12 has a central recess or an opening 12. A not shown mounting screw extends through the central recess or the opening for the mounting the knock sensor directly or indirectly on the motor block of the internal combustion engine. During the mounting of the knock sensor the whole torque which is applied by the above described mounting screw for mounting on the motor block is transferred to the pressure sleeve 2 through the lower surface 3. In other words, no force is applied to the piezo-ceramic disk 6 as a sensor element, during the mounting.

A tensioning force acts here by the pressure of a spring 20 with a wedge ring 21 inserted with tensioning. The tensioning force is selected so that the axial forces act on the piezo-ceramic disk 6 directly without worsening of the electrical signal, and they are independent from thermal expansions as well as unavoidable upsetting of the pressure sleeve 2 during mounting. The pulses produced by the seismic mass 7 proportionally to the vibrations of the internal combustion engine are converted in the piezo-ceramic disk 6 in charging pulses which are readable on a corresponding measuring device.

FIG. 2 shows the wedge ring 21 which is provided with a slot 23. The angle α of the wedge shape can be for example within the region of 3°–30° with respect to the gripping surface of the pressure sleeve 2.

Figure 3:
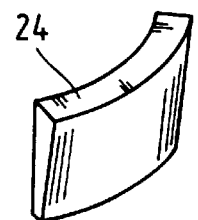
FIG. 3 is a view showing a wedge formed as a circular segment of the inventive vibration pickup.
Figure 4:
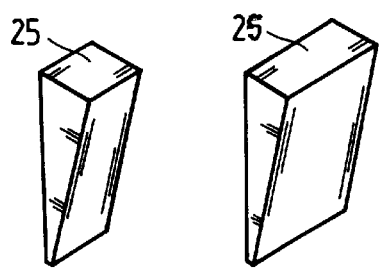
FIG. 4 is a view showing a wedge with a straight contour of the inventive vibration pickup.
Figure 5:
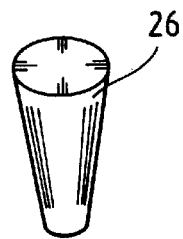
FIG. 5 is a view showing a wedge formed as a wedge pin of the inventive vibration pickup.

FIG. 3 shows a circular segment 24. FIG. 4 shows a wedge 25 with approximately square and with rectangular cross-section with a corresponding straight contour. FIG. 5 shows a wedge pin 26. Here three wedges or circular segments suffice for fixing the total composite structure as described herein above.

Figure 6:
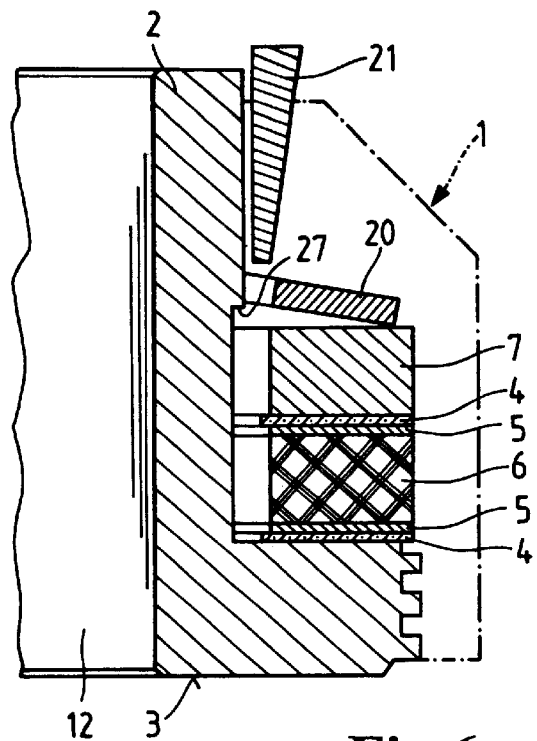
FIG. 6 is a view showing a partial section of a vibration pickup with barbs on the pressure sleeve before tensioning of the components.
Figure 7:
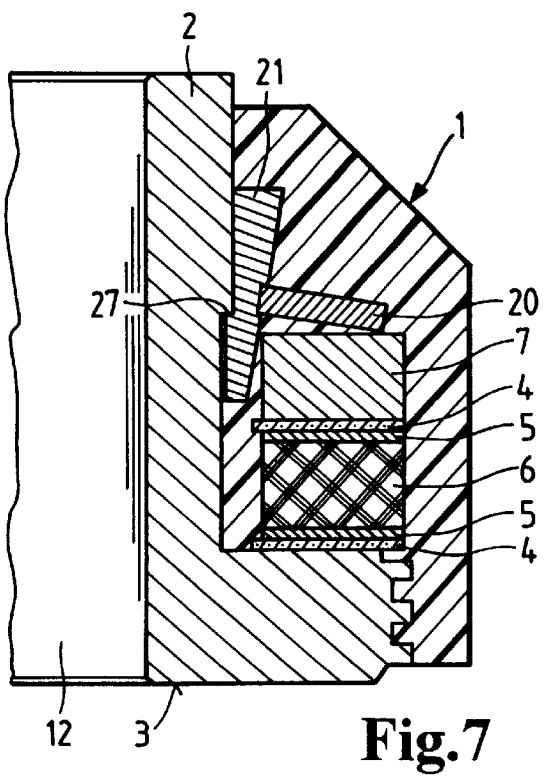
FIG. 7 is a view showing a partial section of a vibration pickup with barbs on the pressure sleeve after tensioning of the components as a kneaded composite structure.

FIG. 6 shows how a wedge ring 21 or possibly also the wedge ring 21 of FIG. 2 or the wedges (24, 25, or 26) are inserted for tensioning of the total arrangement. A barb is arranged on the pressure sleeve 2. During insertion of the wedge ring 21 it is clamped between the barb 27 and the spring 20 so that with the thusly produced pressure these components are kneaded in the wedge ring 21. Thereby the total arrangement shown in FIG. 7 is fixedly clamped.

Figure 8:
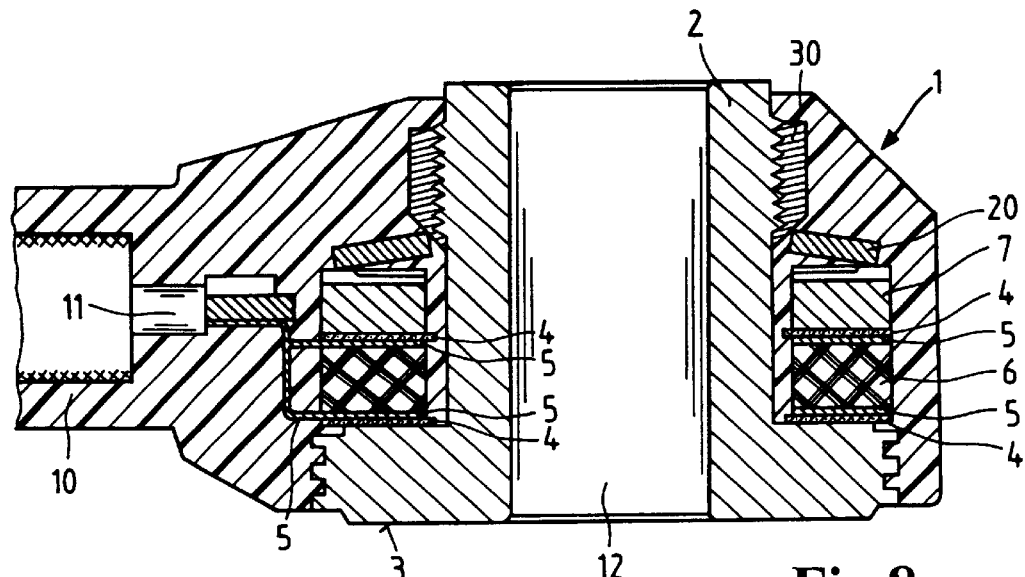
FIG. 8 is a view showing a section through the vibration pickup with a wedge ring having an inner thread.
Figure 9:
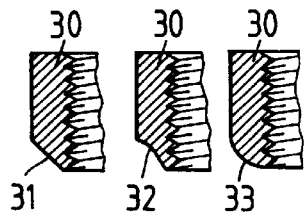
FIG. 9 is view showing various contours of the wedge ring of FIG. 8.

In the embodiment of FIG. 8 a ring 30 is threaded on a thread of the pressure sleeve 2. This ring 30 is formed wedge-shaped in a lower region and provides the above described action during tensioning of the components. FIG. 9 shows several alternatives including a straight, wedge-shaped tip 31, a substantially concave or parabolic tip 32 and a substantially convex tip 33 on a wedge-shaped ring 30 with the inner thread.

Figure 10:
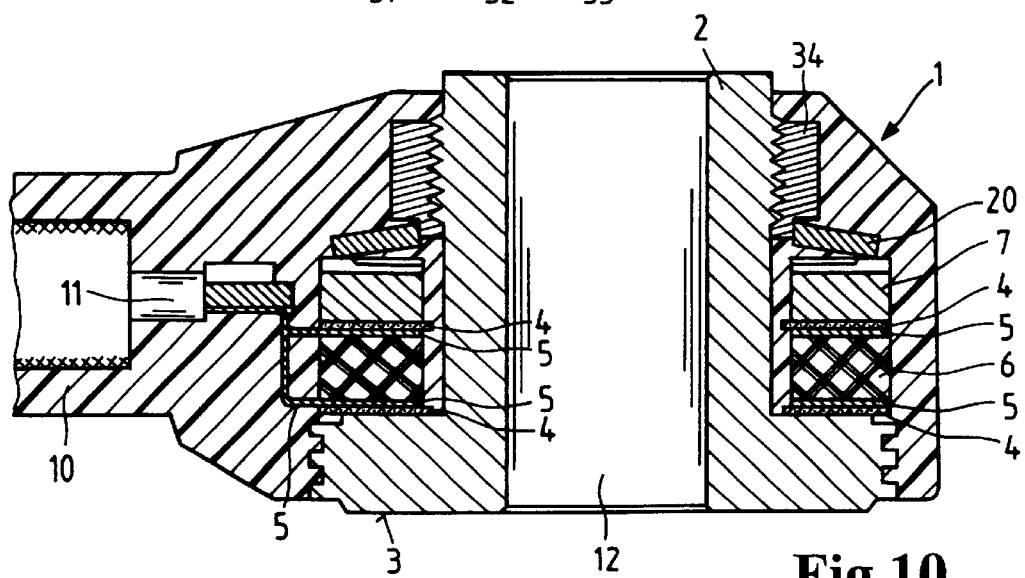
FIG. 10 is a view showing a section through a vibration pickup with a stepped shape of the wedge ring having an inner thread.
Figure 11:
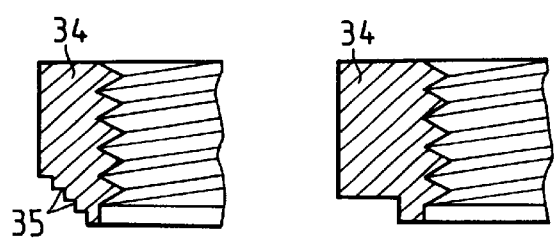
FIG. 11 is a view showing various contours of the wedge ring of FIG. 10.

A further embodiment of FIG. 10 shows a deviation of the structural form of FIG. 8. Here a ring 34 in a lower region has a stairs-like tip which is shown in detail in FIG. 11. FIG. 11 also shows in addition an embodiment of the ring 34 with a multiple steps 35 of the stairs shape.

Figure 12:
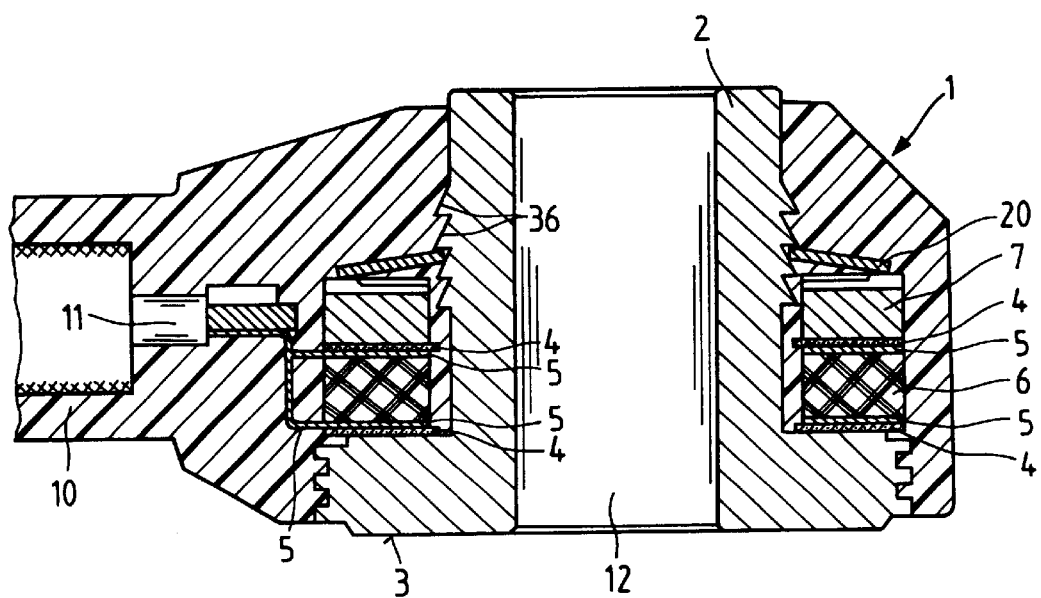
FIG. 12 is a view showing an embodiment with a saw-teeth-shaped contour of the pressure sleeve.

In the embodiment of FIG. 12 the outer wall of the pressure sleeve 2 has at least partially a saw-tooth-shaped contour. The saws-tooth-shape can be for example produced by concentric projections 36. These projections acts as barb for a flat spring 20. During mounting, the flat spring 20 is displaced over the projection or projections and comes in the desired position to abutment against the shoulder of the projection 36.

It will be understood that each of the elements described above, or two or more together, may also find a useful application in other types of constructions differing from the types described above.

While the invention has been illustrated and described as embodied in vibration pickup with a pressure sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vibration pickup, comprising a pressure sleeve mountable directly or indirectly on a component causing vibrations; a spring; a sensor element which is held radially outwardly on said pressure sleeve with an axial tensioning by said spring and is electrically contactable; and means for simultaneously radially clamping said spring and axially tensioning components of said sensor element, said means including wedge element provided between an inner periphery of said spring and an outer wall of said pressure sleeve, said wedge element being introduced axially with its wedge-shaped tipped side and radially clamps said spring in an end position and also holds the components with said sensor element under an axial tensioning.

2. A vibration pickup as defined in claim 1, wherein said wedge element is formed as a wedge ring.

3. A vibration pickup as defined in claim 2, wherein said wedge ring has at least one throughgoing slot extending in an axial direction.

4. A vibration pickup as defined in claim 1, wherein said wedge element include at least three wedges each inserted axially with its wedge-shaped, tipped side and in an end position radially clamping said spring and simultaneously holding components with said sensor element under the axial tensioning.

5. A vibration pickup as defined in claim 4, wherein said wedges are formed as circular segments.

6. A vibration pickup as defined in claim 4, wherein said wedges have a straight contour.

7. A vibration pickup as defined in claim 4, wherein said wedges are formed as wedge pins.

8. A vibration pickup as defined in claim 2, wherein said wedge ring is formed of a material such that, after tensioning of all components of the vibration pickup, said spring and a barb on said pressure sleeve are kneaded in said wedge ring.

9. A vibration pickup as defined in claim 4, wherein each said wedges is formed of a material such that after tensioning of all components of the vibration pickup said, spring and a barb on said pressure sleeve are kneaded in said wedge.

10. A vibration pickup as defined in claim 2, wherein said wedge ring has a gripping surface on said pressure sleeve and is provided with a rough surface contour.

11. A vibration pickup as defined in claim 4, wherein each said wedges has a gripping surface on said pressure sleeve and is provided with a rough surface contour.

12. A vibration pickup as defined in claim 2, wherein said wedge ring is formed as a ring which has an inner thread and a wedge-shaped projection with which is axially turned in.

13. A vibration pickup as defined in claim 12, wherein said wedge ring has a wedge-shaped tip with a contour selected from the group consisting of a concave contour, a convex contour, a parabolic contour and a hyperbolic contour.

14. A vibration pickup as defined in claim 12, wherein said ring has a wedge-shaped tip which has a straight contour.

15. A vibration pickup as defined in claim 12, wherein said ring with said inner thread has a stairs-shaped projection which is wedge shaped.

16. A vibration pickup as defined in claim 2, wherein said wedge ring is composed of metal.

17. A vibration pickup as defined in claim 4, wherein said wedges are composed of metal.

18. A vibration pickup as defined in claim 2, wherein said wedge ring is composed of synthetic plastic.

19. A vibration pickup as defined in claim 4, wherein said wedges are composed of synthetic plastic.

20. A vibration pickup as defined in claim 2, wherein said wedge ring is welded with said pressure sleeve after mounting.

21. A vibration pickup as defined in claim 4, wherein said wedges are welded with said pressure sleeve after mounting.

22. A vibration pickup, comprising a pressure sleeve which is mountable directly or indirectly on a component which causes vibrations; a spring; a sensor element which is held radially outwardly on said pressure sleeve with an axial tensioning by said spring and is electrically contactable, said pressure sleeve having an outer wall which at least in a partial region has a saw-tooth shape with shoulders, said spring engaging in said shoulders of said saw tooth shape.

23. A vibration pickup as defined in claim 1, wherein said pressure sleeve is formed so that it is mountable on the component which is a motor block of an internal combustion engine in a motor vehicle.

\* \* \* \* \*